Patented Sept. 9, 1947

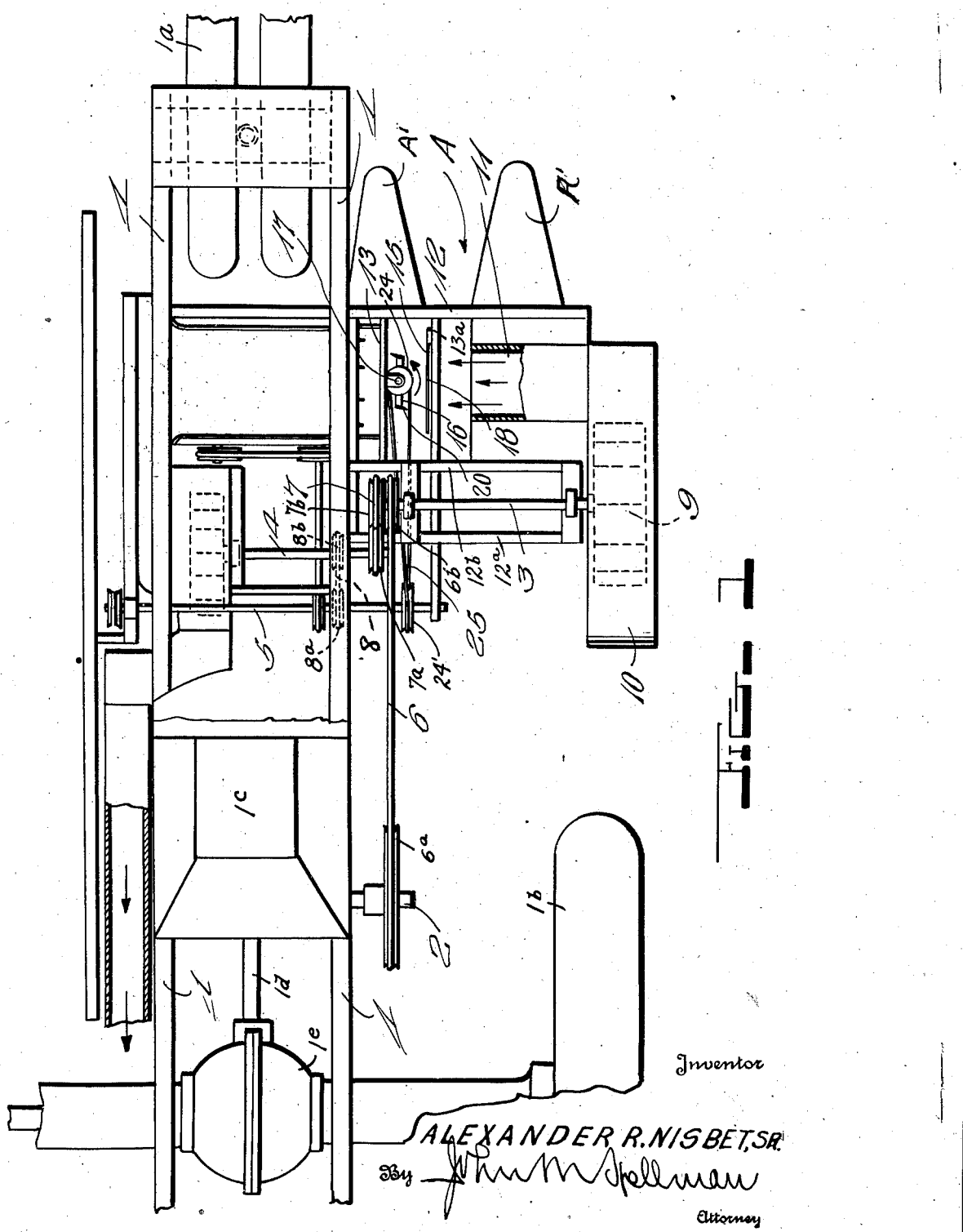

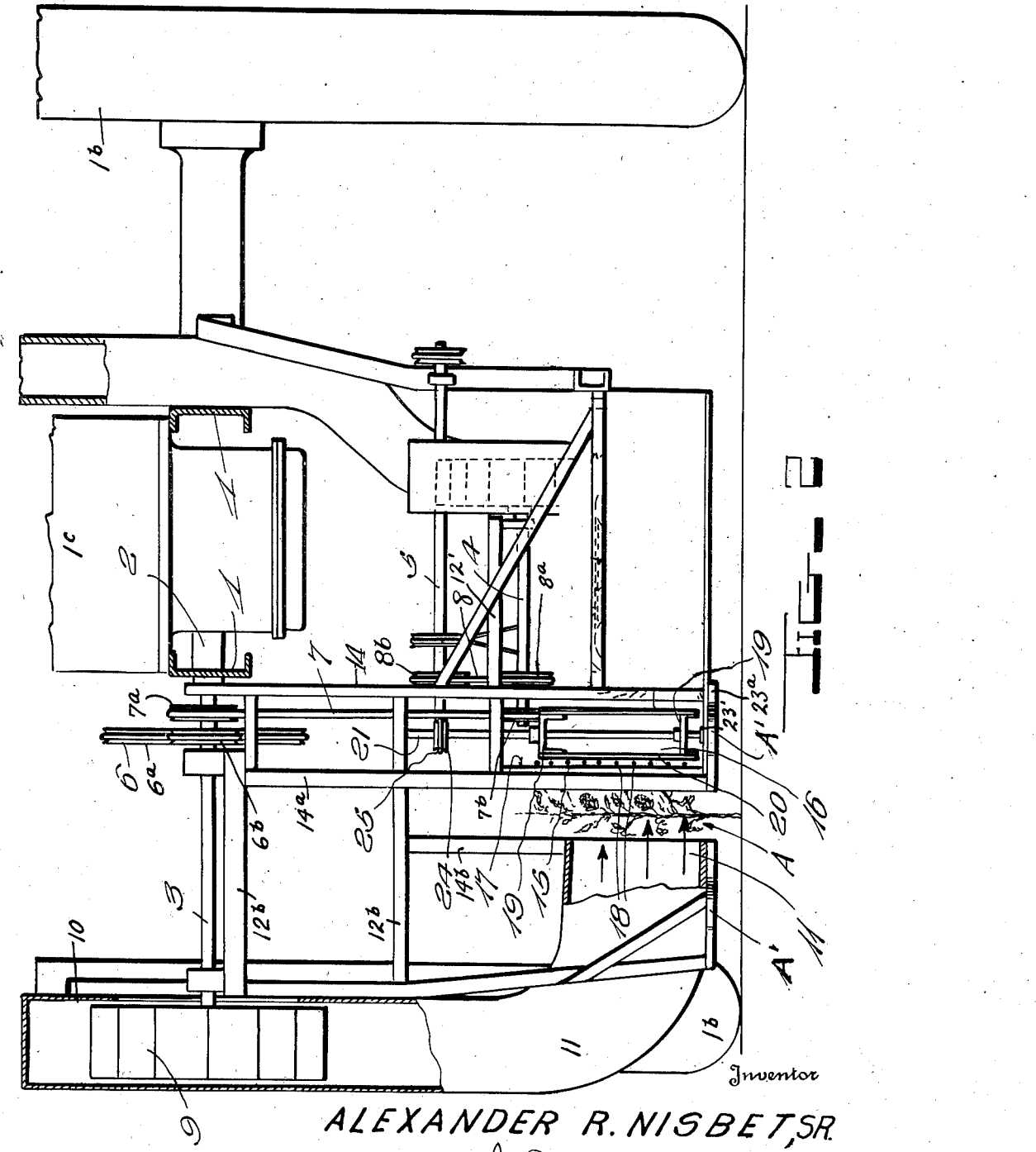

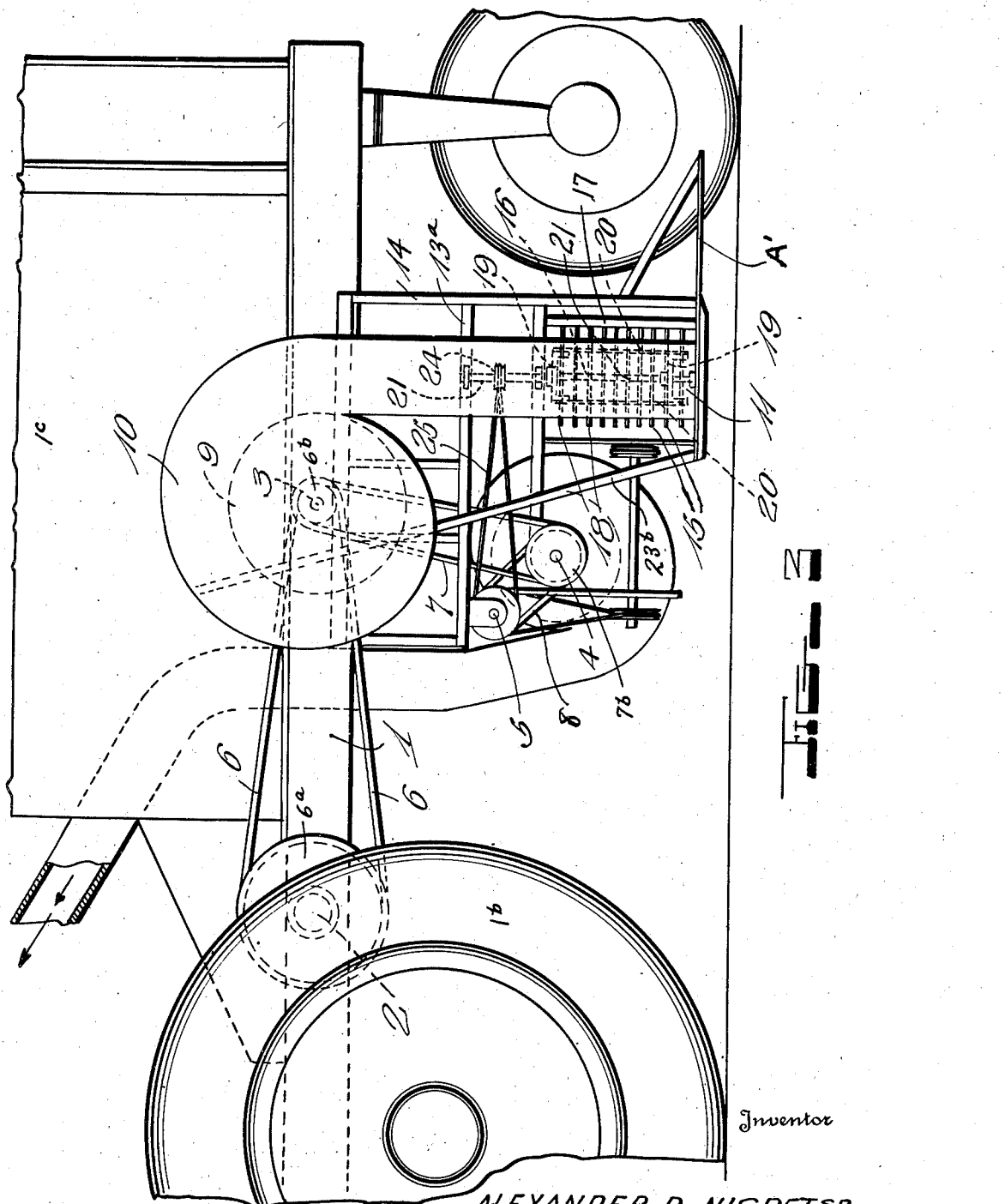

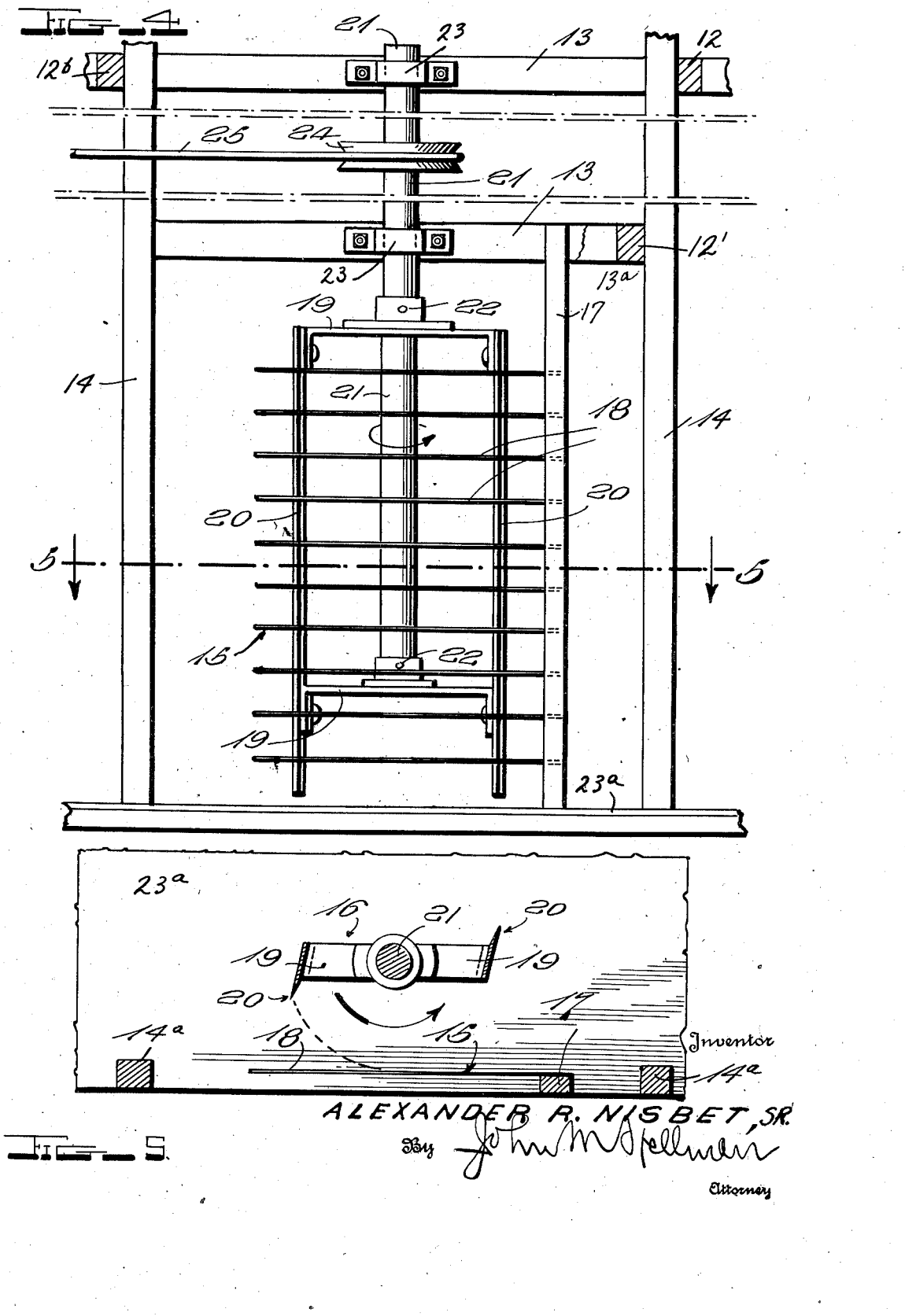

2,427,155

UNITED STATES PATENT OFFICE 2,427,155

COTTON PLANT DELEAFER

Alexander R. Nisbet, Sr., San Angelo, Tex.

Application June 7, 1945, Serial No. 598,042

12 Claims. (Cl. 56—233)

This invention relates to a cotton plant deleafer or device for removing leaves, green and otherwise, from cotton plants preparatory to an operation of picking ripened cotton from the bolls of the plants, so as to put the plants in a condition most suitable for the removal of the cotton from the open bolls without interference from the leaves of the plants, and so as to prevent removal during a picking operation with the cotton of leaves or portions of leaves liable to occur when leaves are present on the plants at the time the cotton is being picked.

The deleafer constituting the present invention may be mounted on a tractor or other ambulant vehicle and used as an independent implement for a deleafing operation prior to the use of a separate picking machine, or it may be designed so as to be mounted on a picking machine on the removal of, and to take the place of, the picking elements on the picking machine, where the construction of the picking machine is such that a single apparatus may be used and converted from a picking machine to a deleafing machine, and vice versa.

The deleafer herein shown and described is especially designed and adapted for use on a picking machine of the type shown in my prior Patent No. 1,961,447, dated June 5, 1934, in which the force of an air blast and the resistance and picking action of a rotating foraminous or openwork picker effect the removal of the cotton from the bolls. For such use the construction of the deleafer and picker means of the picking machine is such that the picking means may be removed and the deleafer substituted in its place so that the deleafer will act on plants forced against it by the air blast to remove the leaves from the plants without injury to the bolls or cotton. It is to be understood, however, that I do not restrict the deleafer to use on a cotton picking machine, as it may be built and operated as a machine designed strictly and solely for deleafing purposes.

One object of my invention is to provide a deleafer whereby leaves may be removed from cotton plants, for the purpose designed, in a rapid and cleanly manner and without injury to the stalks, bolls or cotton of the plants.

Another object of the invention is to provide a deleafer which will operate in conjunction with an air blast from a suitable source to effect the removal of the leaves.

The invention consists of the novel features of construction, combination and arrangement of parts, hereinafter fully described and claimed, and as shown in the accompanying drawings, in which:

Fig. 1 is a top plan view of the deleafer mounted on a tractor, a portion of which is shown, and which may comprise parts of a picking machine from which the pickers have been removed and the deleafer substituted therefor;

Fig. 2 is a front elevation thereof on a larger scale than Fig. 1 with parts in section;

Fig. 3 is a view in elevation on the same scale as Fig. 1 looking toward one side of the machine;

Fig. 4 is a view in side elevation on a still larger scale than Fig. 2 of the deleafing cutter and grid; and Fig. 5 is a horizontal section of the same, taken on line 5—5 of Fig. 4.

Referring now more particularly to the drawings, 1 designates the main frame bars of a row tractor having a power take-off shaft 2, and on which are mounted a fan shaft 3 and transmission shafts 4 and 5. The tractor is shown only in outline and needs but little explanation. It includes, as shown, front supporting and steering wheels $1^a$, rear supporting and driving wheels $1^b$, a suitable body $1^c$ in which may be mounted a motor (not shown) of any known type, a propeller shaft $1^d$ driven by the motor, and a differential gearing $1^e$ driven by the propeller shaft and through which the wheels $1^b$ are driven. The steering elements and other parts of the tracks are not shown, as they may be of well known type and their showing is not necessary to a disclosure of the invention. The power take-off shaft 2 may be driven from the propeller shaft $1^d$ or directly from the motor shaft in any suitable and preferred manner. A belt 6 passing around pulleys $6^a$ and $6^b$ drives the shaft 3 from the shaft 2; a belt 7 passing around pulleys $7^a$ and $7^b$ drives the shaft 4 from the shaft 3, and a belt 8 passing around pulleys $8^a$ and $8^b$ drives the shaft 5 from the shaft 4. On shaft 3 is mounted a blast fan 9 disposed in a casing 10 having a discharge nozzle 11 arranged at one side of the machine and facing toward the opposite side of the machine.

Arranged in spaced relation to the nozzle 11, toward the latter-named side of the machine is a frame construction comprising front, rear, and intermediated transverse frame members 12, $12^a$, $12^b$, and $12'$, longitudinal frame members 13, $13^a$, and vertical frame members 14, $14^a$ and $14^b$. These frame members are disposed so that the space A between the frame members $14^a$ and the blast nozzle forms in conjunction with guides A' a passageway for the plants in the travel of the plants along a plant row. The parts as thus far described comprise elements on the tractor or other ambulant vehicle for cooperation with the deleafing device where the deleafing device is designed for use as an independent machine. Such parts may also accord generally with parts shown in my aforesaid patent, in which said parts are designed for the mounting of a foraminous picker drum or a group of picker saws arranged to act upon the plants forced thereagainst by an air blast from the blast nozzle to pick cotton from the bolls of the plants, as shown and described in said patent. When designed for use upon a picking machine of this character the deleafer is constructed to be substituted for the picker element or elements which are removed from the machine to adapt the machine to be used as a deleafer for the removal of leaves from the plants to place them in better condition for a subsequent picking operation. After the plants of a field are deleafed by the machine the deleafer is removed therefrom and the picker element or elements replaced to adapt the machine for use as a picker.

The deleafer comprises a grid or openwork baffle screen 15 and a rotary cutter 16. The grid may be of any suitable construction, but as shown consists of a post or upright 17 to which are welded or otherwise fixed at one end spaced horizontal rods 18. The cutter and grid are arranged between the frame members 13, 13ª, 14, 14ª in front or rear of the frame members 14ª and is suitably secured to the frame structure formed thereby. The grid is interposed between the plants received in the space A and the cutter 16 and extends to a height coextensive in height with plants of maximum height and forms a slightly yielding guard screen against which the plants are forced by the air blast. The grid prevents the stalks and bolls of the plants from coming in contact with the cutter, but allows the leaves to pass through the spaces between the rods so that the leaves will be exposed to the action of the cutter.

The cutter 16 comprises a pair of spaced horizontal frame members 19 and a pair of vertical cutter blades 20 which are suitably fastened to said frame members. These cutter blades are arranged 180° apart in the orbit or rotation of the cutter and their cutting edges are disposed to act upon the leaves of the plants in rapid succession as the cutter revolves. A shaft 21 passes through apertures in the members 19 and is fastened by suitable fastening members 22 thereto. Brackets 23 in which the shaft is mounted to revolve are provided for attachment to and supporting the cutter from the frame members 12 and 13. The lower end of the shaft is also mounted in a bearing 23' on a base plate 23ª attached to the frame bars 14, 14ª and stayed by a brace 23ᵇ from the main frame. On the upper end of the shaft is a pulley 24 whereby the cutter is driven by a belt 25 from a pulley 24' on the shaft 5.

In practice the machine is driven along a row of plants and the blast from the fan forces the plants against the grid 15. As stated, this grid shields the stalks and bolls of the plants from the cutter while the blast from the fan forces the leaves through the spaces between the grid rods so that the leaves are exposed to the action of the cutter which in rotating severs them from the plants without injury to the stalks, bolls or cotton. By running the implement first in one direction and then in the opposite direction along a row of plants both sides of the plants with be exposed so as to be acted upon by the cutter for the removal of substantially all the leaves. By this means the plants are left in a condition in which the cotton bolls are fully exposed for the removal of the cotton from the bolls by a picker of the character disclosed in my aforesaid patent without interference with the picking operation caused by the presence of leaves.

From the foregoing description, taken in connection with the drawings, the construction, mode of operation and advantages of my invention will be readily understood and appreciated by those versed in the art without a further and extended description. While the structure disclosed for the purpose is simple, reliable and efficient, and is preferred, it will of course be understood that the invention is not limited thereto, and that changes in the form, construction and arrangement of parts, falling within the scope of the appended claims, may be made without departing from the spirit of sacrificing any of the advantages of the invention.

Having thus described my invention, I claim:

1. A cotton plant deleafer comprising a supporting frame, an air blast device on the frame, cutting means on the frame spaced from the blast device to provide an intervening plant passage and toward which the cotton plants of a row disposed in said passage are forced by the blast for action by the cutter to cut away leaves from the plants, and a guard grid supported by the frame and arranged at one side of the passage between the air blast device and cutter and adjacent the latter, said grid having passages to permit the leaves of the plant to project therethrough for removal by cuting action of the cutter.

2. A cotton plant deleafer comprising a supporting frame, an air blast device on the frame, deleafing means including a rotary cutter spaced from the blast device to provide an intervening plant pasage and toward which the cotton plants of a row disposed in said passage are forced by the blast for action by the cutter to cut away leaves from the plants, and a guard grid supported by the frame and arranged at one side of the passage between the air blast device and cutter and adjacent the latter, said grid having passages of a size to permit only the leaves of the plants to project therethrough for removal by cutting action of the cutter.

3. A cotton plant deleafer comprising a supporting frame for attachment to a vehicle, an air blast device on the frame, deleafing means on the frame and comprising a foraminous baffle against which plants of a row are forced by the blast and having openings of a size to permit the leaves of the plants to pass therethrough while preventing passage therethrough of the stalks and bolls of the plants, and a rotary cutter arranged behind said baffle and operative to sever leaves from the plants forced through the openings in the baffle.

4. A cotton plant deleafer comprising a frame, a fan on the frame for producing an air blast, a grid on the frame spaced from the fan outlet to provide a plant passage therebetween and against which the plants of a row are forced by the blast, cutter means behind the grid operable to cut away leaves projecting through the grid from the plants forced against the grid, and means for operating the fan and cutter means.

5. A cotton plant deleafer for attachment to an ambulant vehicle having a source of power thereon, comprising a frame, a blast fan on the frame having a discharge nozzle, a grid on the frame spaced from the nozzle to provide a passage therebetween for plants in the travel of the vehicle along a plant row and against which the plants are forced by the blast, said grid being formed of a plurality of superposed spaced horizontal rods, a rotary cutter arranged behind the grid, said cutter being mounted to rotate on a vertical axis and having cutter blades to successively operate in its orbit of rotation to cut away leaves projecting from the plants through the passages between the spaced rods of the grid, and means for operating the fan and cutter from said source of power on the vehicle.

6. A cotton plant deleafer comprising a supporting frame for attachment to a traveling vehicle, means thereon for producing an air blast, a screen arranged in the path of the blast and so as to adapt the plants to be forced thereagainst by the force of the blast, said screen having openings of a size to permit of the passage of the leaves of the plants therethrough while preventing passage therethrough of the stalks and bolls, a cutter having spaced vertical blades arranged at 180° apart and rotatable about a vertical axis to cause the blades to move in proximity to and past the screen to cut away leaves from the plants, and means for operating the blast producing means and the cutter.

7. A cotton plant deleafer comprising a frame for attachment to a traveling vehicle, said frame having a plant passageway, means thereon for producing an air blast, a screen embodying spaced rods arranged in the path of the blast and so as to adapt the plants to be forced thereagainst by the force of the blast, a cutter comprising a vertical shaft carrying spaced vertical blades arranged at opposite sides thereof and rotatable to cause the blades to move in proximity to and past the screen to cut away leaves from the plants, and means for operating the blast producing means and the cutter.

8. A cotton plant deleafer comprising a supporting frame for attachment to a traveling vehicle, said frame having a plant passageway, an air blast device mounted on the frame and having a discharge nozzle disposed at one side of the passageway, a non-rotary vertical grid mounted on the frame at the opposite side of the passageway against which plants of a row are forced by the blast from the nozzle, said grid including members spaced to prevent passage of the stalks and bolls of the plants through the spaces therebetween but to allow passage of the leaves of the plant through said spaces, and a cutter mounted on the frame in rear of the grid and comprising a vertical shaft and vertical cutting blades carried by the shaft for rotation therewith and operative to cut away from the plants the leaves projecting through the spaces between the members of the grid.

9. A cotton plant deleafer comprising a supporting frame for attachment to a traveling vehicle, said frame having a plant passageway, an air blast device mounted on the frame and having a discharge nozzle disposed at one side of the passageway, a grid mounted on the frame at the opposite side of the passageway against which plants of a row exposed in the passageway are forced by the blast from the nozzle, said grid including a plurality of superposed parallel flexible rods yieldable to a predetermined degree under force of the blast and pressure of the plants and spaced to prevent passage of the stalks and bolls of the plants through the spaces therebetween but to allow passage of the leaves of the plants through said spaces, and a cutter mounted on the frame in rear of the grid and operative to cut away from the plants the leaves projecting through the spaces between the rods of the grid.

10. A cotton plant deleafer comprising a supporting frame for attachment to a traveling vehicle, said frame having a plant passageway, an air blast device mounted on the frame and having a discharge nozzle disposed at one side of the passageway, a grid mounted on the frame at the opposite side of the passageway against which plants of a row exposed in the passageway are forced by the blast from the nozzle, said grid including a plurality of superposed, horizontal, parallel flexible rods yieldable to a predetermined degree under force of the blast and pressure of the plants and spaced to prevent passage of the stalks and bolls of the plants through the spaces therebetween but to allow passage of the leaves of the plants through said spaces, and a cutter mounted on the frame in rear of the grid and comprising a vertical shaft and vertical cutting blades carried by the shaft for rotation therewith and operative to cut away from the plants the leaves projecting through the spaces between the rods of the grid.

11. A cotton plant deleafer comprising a supporting frame for attachment to a traveling vehicle, said frame having a plant passageway, an air blast device mounted on the frame and having a discharge nozzle disposed at one side of the passageway, a grid mounted on the frame at the opposite side of the passageway against which plants of a row exposed in the passageway are forced by the blast from the nozzle, said grid including a vertical support and a plurality of superposed parallel rods fixed at one end to the support but otherwise free to yield to a predetermined extent under pressure of the blast and plants, said rods being spaced to prevent passage of the stalks and bolls of the plants through the spaces therebetween but to allow passage of the leaves of the plants through said spaces, and a cutter mounted on the frame in rear of the grid and operative to cut away from the plants the leaves projecting through the spaces between the rods of the grid.

12. A cotton plant deleafer comprising an ambulant supporting structure provided with a plant passage, a blast device at one side of the passage, leaf cutting means at the opposite side of the passage, a guard screen arranged at the same side of the passage as the leaf cutting means and between the same and the passage, against which plants disposed in the passage are blown by a blast from the blast device, said guard screen operating to hold the stalks and bolls of the plants from movement into the path of the cutting means while permitting passage of the leaves of the plants therethrough into the cutting path of the cutting means.

ALEXANDER R. NISBET, Sr.

REFERENCES CITED

The following references are of record in the file of this patent:

UNITED STATES PATENTS

| Number | Name | Date |
|---|---|---|
| 1,961,447 | Nisbet | June 5, 1934 |
| 957,620 | Michalka | May 10, 1910 |
| 2,242,524 | Hunt | May 20, 1941 |
| 1,794,658 | Walsh | Mar. 3, 1931 |